United States Patent

Bolton

[15] 3,660,193

[45] May 2, 1972

[54] A–I POLYMER LAMINATES PREPARED BY FILAMENT WINDING

[72] Inventor: Benjamin A. Bolton, Winfield, Ill.
[73] Assignee: Standard Oil Company, Chicago, Ill.
[22] Filed: Mar. 5, 1971
[21] Appl. No.: 121,522

Related U.S. Application Data

[63] Continuation-in-part of Ser. No. 748,954, July 31, 1968, abandoned.

[52] U.S. Cl..............................156/169, 156/172, 156/175, 156/272, 156/327, 117/126 GR, 260/78 TF
[51] Int. Cl.............................................................B65h 81/00
[58] Field of Search...................156/173, 172, 175, 169, 162, 156/180, 272, 327; 117/18, 27, 126 GR, 126 GQ, 137; 260/78 TF

[56] References Cited

UNITED STATES PATENTS

| | | | |
|---|---|---|---|
| 2,749,266 | 6/1956 | Eldred | 156/173 |
| 3,033,729 | 5/1962 | Shobert | 156/161 X |
| 3,216,876 | 11/1965 | Tyhurst | 156/173 |
| 3,260,691 | 7/1966 | Lavin | 260/78 TF X |

OTHER PUBLICATIONS

New Linear Polymers, Research & Development Center, The Epoxylite Corporation, South El Monte, Calif., McGraw-Hill Book Company, pages 185–186.

Primary Examiner—Carl D. Quarforth
Assistant Examiner—E. E. Lehmann
Attorney—Arthur G. Gikes, William T. McClain and Robert W. Fletcher

[57] ABSTRACT

A continuous process for preparing a heat resistant polymer laminate, said process comprising: (1) coating glass fibers with a solution comprising an uncured aromatic polytrimellitamide polymer, having imide forming groups, dissolved in a suitable solvent, (2) flashing off a limited amount of solvent at a temperature below the curing temperature of said uncured aromatic polytrimellitamide polymer, leaving said polymer uniformly deposited on the surface of said fibers, (3) winding said fibers on a mandrel, and (4) curing the polymer leaving essentially no unconverted imide forming groups, thus preparing said polymer laminates.

13 Claims, No Drawings

A-I POLYMER LAMINATES PREPARED BY FILAMENT WINDING

CROSS-REFERENCE TO RELATED APPLICATIONS

This application is a continuation-in-part of U.S. Pat. application, Ser. No. 748,954, filed July 31, 1968, now abandoned.

BACKGROUND OF THE INVENTION

Useful glass reinforced polymer compositions have previously been prepared from aliphatic polyamides, derived from aliphatic diamines and dicarboxylic alkyl acids. Such polymers have exhibited poor heat resistance and are unsatisfactory for use at high temperatures. Other glass reinforced polymer compositions have been prepared using aromatic polyimides, derived from aliphatic diamines and aromatic dianhydrides, the latter being expensive starting materials, making such polymer compositions too costly for many uses.

Inexpensive aromatic polymer compositions with improved high temperature properties are taught in French Pat. No. 1,449,950, which is hereby incorporated by reference. Advantageously, the polymers are prepared from p,p'-oxybis(aniline), m-phenylene diamine or preferably, p,p'-methylenebis (aniline). The polymers (see below) have trifunctionally provided by an aromatic tricarbonyl radical derived from trimellitic anhydride.

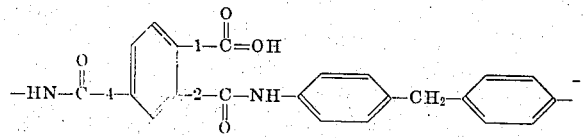

The resulting polytrimellitamide polymers above are uncured polymers which have imide forming groups and which are further characterized as being soluble in N,N-dimethylacetamide, N-methylpyrollidone, and the like. (For purposes of the specifications and claims, this polymer and its isomer, having the one and two carbon functions reversed, will be referred to as A-I polymer type MBA). The uncured polymers contain amido and carboxylic groups which are capable of further reaction to form imido groups. The result of such a reaction, upon heating, (curing) is an imido group with the carbonyl groups in the 1 and 2 positions of the above structural formula. Curing produces polymers which have essentially no unconverted imide forming groups. Thus glass reinforced resin compositions can be prepared from an uncured aromatic polytrimellitamide polymer having imide forming groups and being soluble in N, N-dimethylacetamide with such polymer being convertible to a cured aromatic polytrimellitamide polymer having essentially no unconverted imide forming groups.

Glass reinforced resin compositions prepared from such aromatic polytrimellitamide polymers are used to produce sheets of inexpensive, heat resistant laminates. Such laminates are very useful; however, they have certain disadvantages, for example: (1) they can only be formed with pressure, (2) they cannot be formed into intricate shapes (3) they must be formed from fiberglass sheet or other types of fibrous glass such as, woven fabrics, fibermats and the like and (4) they cannot be formed by a continuous process.

SUMMARY OF THE INVENTION

I have now discovered a process for continuously fabricating glass fibers into a glass reinforced resin compound from the aromatic polytrimellitamide polymer described above, and fabricating said glass reinforced resin compound into intricate shapes such as round and square tubes. The process uses inexpensive materials yet provides excellent high temperature properties. The process comprises (1) coating glass fibers with a solution comprising an uncured aromatic polytrimellitamide polymer, having imide forming groups, dissolved in a suitable solvent, (2) flashing off a limited amount of solvent at a temperature below the curing temperature of said uncured aromatic polytrimellitamide polymer, leaving said polymer uniformly deposited on the surface of said fibers, (3) winding said fibers on a mandrel, and (4) curing the polymer leaving essentially no unconverted imide forming groups, thus preparing said polymer laminates.

The new process disclosed herein differs from prior art processes in that this process results in a product having a much higher ratio of glass to cured polymer. The advantage of a high ratio of glass to cured polymer is the increased strength of such a product. Such strength is due to the fact that the glass is stronger than the cured polymer. Thus it becomes the objective in optimizing the laminate strength to uniformly coat the glass fibers with a very thin coating of uncured resin. Such a very thin coating is most easily accomplished by using a larger excess of solvent to dissolve the uncured resin. However, use of a large excess of solvent results in coated fibers which are difficult and inconvenient to handle absent some method of removing the solvent. The solvent must be removed by a method which avoids removing any of the uncured polymer, thus wiping or scraping are unacceptable. Also the method of removing the solvent must avoid partial curing of uncured polymer since partial curing results in less cross-linking between the glass fibers and thus a weakened laminate. Suitable methods of removing the solvent include heat flashing off the solvent, being careful that the temperature at the surface of the coated glass fibers does not reach the curing temperature of the uncured polymer. Another suitable method of removing the solvent is to use a vacuum to flash the solvent off. Equally acceptable is a combination of heat and vacuum as long as the temperature at the surface of the coated fibers does not reach the curing temperature of the uncured polymer.

It is possible to avoid the partial curing of the uncured polymer on the glass fibers during the flashing off of the excess solvent, even if the solvent vaporizes at a temperature above the curing temperature of the uncured polymer. Such is accomplished by flashing off only a limited amount of the solvent. For example it is possible to use a flow of hot air to flash off a major portion of the solvent on the coated glass fibers and leave between about 10 and 20 weight percent solvent, based upon the total weight of the coated fibers. The motion of the hot air aids vaporization and the remaining 10 to 20 weight percent of solvent sufficiently insulates the coated fibers so that no curing of the uncured polymer takes place. Most preferably the amount of solvent left on the coated glass fibers is between about 12 and about 14 weight percent based upon the weight of the coated glass fibers. The solvent will, of course, be quite thoroughly removed during the curing step thus the product does not have weak spots due to entrained solvent. The fact that no curing was allowed to occur results in the glass fibers being easily wound on a mandrel and laminated without pressure.

The resulting laminates have the additional advantages in that they can be continuously formed in various shapes by changing the shape of the mandrel.

PREFERRED EMBODIMENTS

EXAMPLE I

Five spools of glass fiber in the form of 20-end glass roving were simultaneously used in the process. "Roving," is the least expensive form of glass fiber available. It consists of a loose assemblage of single fibers (20 herein) which are drawn into a single strand with very little twisting about the individual fiber axis (hereinafter a strand of roving will be referred to as a "thread"). The threads were passed through an amide-imide forming polymer solution composed of the following weight percentages, based on the total weight of solution, of the various compounds: 26 percent A-I polymer type MBA, 37 percent N-methylpyrollidone and 37 percent dimethylformamide. Heat guns were used to flash off the solvent without curing the A-I polymer leaving a uniform coating of said polymer, tacky to touch, on the surface of the fibers. There remained 14 weigh percent solvent after flashing. (Note: the glass fibers contain more solvent than those in French Pat. No. 1,339,950, to facilitate lamination without pressure). The five threads were then wound on a mandrel rotating at a speed of from 7 ½ to 10 RPM. The threads were wound in such a manner that each thread laid side by side next to another thread, forming a layer one thread diameter thick. Several layers were placed one on top of the other until the laminate was approximately ⅛ inch thick. The helix angle (angle between a perpendicular to the rotating mandrel and the threads winding on the mandrel) was 54 ¾°. The diameter of the mandrel was 2 inches and the tension on the threads was maintained at 56 pounds. The wound threads were then cured by heating them for 1 hour each at 250°, 300°, 350°, 400° and 450° F, with a major portion of the curing occuring at about 450° F.

EXAMPLE II

The procedure of Example I was followed except that the excess polymer was wiped from the wound threads with N-methylpyrollidone solvent prior to curing. The resulting polymer laminate was found to be free from blisters after curing.

EXAMPLE III

The procedure of Example I was followed except that the polymer solution was composed of the following weight percentages, based on the total weight of solution, of the compounds: 20 percent A-I polymer type MBA, 48 percent N-methylpyrollidone and 32 percent xylene. There remained 12 weight percent solvent after flashing. The solution was less expensive than that used in Example I.

EXAMPLE IV

Laminates were prepared according to the procedure of Example I and Example III. The table below shows the results of analysis of the laminates after curing.

| Component | Laminates of Example I | Laminates of Example III |
| --- | --- | --- |
| Polymer | 20.2 wt. % (based on wt. of total components) | 15.9 wt. % (based on wt. of total components) |
| Glass | 77.2 | 80.0 |
| Solvent | 2.6 | 4.1 |

Each of the laminates contained less than 6 percent solvent which is an acceptable upper limit in such cured polymer laminates.

EXAMPLE V

Four inch round and square tubes were prepared according to the process of Example III. The cured tubes had the following compositions.

| | 4 inches Round | 4 inches Square |
| --- | --- | --- |
| Polymer | 29.5 wt. % (based on wt. of total components) | 22.8 wt. % (based on wt. of total components) |
| Glass | 65.8 | 72.0 |
| Solvent | 4.7 | 5.2 |

In each case the tubes were strong and well laminated, suitable for use as a commercial item.

I claim:

1. A continuous process for preparing a heat resistant polymer laminate, said process comprising: (1) coating glass fibers with a solution comprising an uncured aromatic polytrimellitamide polymer, having imide forming groups, dissolved in a suitable solvent, (2) flashing off at least 80 percent of the solvent at a temperature below the curing temperature of said uncured aromatic polytrimellitamide polymer, leaving said polymer uniformly deposited on the surface of said fibers, (3) winding said fibers on a mandrel, and (4) curing the polymer leaving essentially no unconverted imide forming groups, thus preparing said polymer laminates.

2. The process of claim 1 wherein the glass fibers used are in the forms of glass roving.

3. The process of claim 1 wherein the glass fibers are coated with said uncured amide-imide polymer by immersing said fibers in said solution.

4. The process of claim 1 wherein said winding is performed with a helix angle of about 53 ¾°.

5. The process of claim 1 wherein the tension on said glass fibers is about 56 pounds.

6. The process of claim 1 wherein said winding is accomplished by rotating said mandrel at a speed of about 7 ½ to 10 revolutions per minute.

7. The process of claim 1 wherein the curing is accomplished by heating for 1 hour each at 250°, 300°, 350°, 400° and 450° F.

8. The process of claim 1 wherein said polymer solution comprises: 10–30 wt. percent A-I polymer having the following structure,

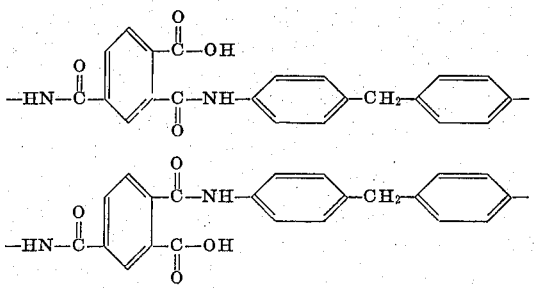

25–50 weight percent N-methylpyrollidone, 0–50 weight percent xylene, and 0–50 weight percent dimethylformamide, all weight percents being based on the total weight of the solution.

9. A continuous process for preparing a heat resistant polymer laminate, said process comprising: (1) coating glass fibers with a solution comprising an uncured aromatic polytrimellitamide polymer, having imide forming groups, dissolved in a suitable solvent, (2) flashing off a limited amount of solvent thereby reducing the amount of solvent remaining to between about 10 and 20 weight percent based upon the total weight of the coated glass fibers, leaving said uncured polymer uniformly deposited on the surface of said fibers, (3) winding said fibers on a mandrel, and (4) curing the polymer leaving essentially no unconverted imide forming groups, thus preparing said polymer laminates.

10. The process of claim 9 wherein the glass fibers used are in the forms of glass roving.

11. The process of claim 9 wherein the glass fibers are coated with said uncured amide-imide polymer by immersing said fibers in said solution.

12. The process of claim 9 wherein said polymer solution comprises: 10–30 weight percent A-I polymer having the following structure,

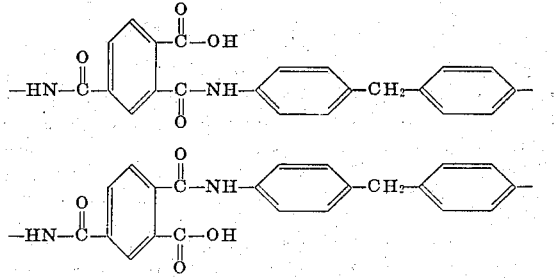

25–50 weight percent N-methylpyrollidone, 0–50 weight percent xylene, and 0–50 weight percent dimethylformamide, all weight percents being based on the total weight of the solution.

13. The process of claim 1 wherein the curing is accomplished by heating for 1 hour each at 250°, 300°, 350°, 400°, and 450° F.